(12) United States Patent
Tiao et al.

(10) Patent No.: US 6,431,709 B1
(45) Date of Patent: Aug. 13, 2002

(54) TRIPLE-LENS TYPE PROJECTION DISPLAY WITH UNIFORM OPTICAL PATH LENGTHS FOR DIFFERENT COLOR COMPONENTS

(75) Inventors: Kuo-Tung Tiao, Hsinchu; Fu-Ming Chuang; Sheng-Hsiung Chan, both of Hsinchu Hsien, all of (TW)

(73) Assignee: Prokia Technology Co., Ltd. (TW)

( * ) Notice: Subject to any disclaimer, the term of this patent is extended or adjusted under 35 U.S.C. 154(b) by 15 days.

(21) Appl. No.: 09/755,484

(22) Filed: Jan. 5, 2001

(51) Int. Cl.[7] .......................... G03B 21/00; G03B 21/26
(52) U.S. Cl. ............................... 353/34; 353/31
(58) Field of Search .......................... 353/34, 82, 31, 353/37, 94, 98, 99; 358/231, 60; 359/48, 49, 70

(56) References Cited

U.S. PATENT DOCUMENTS

| | | | |
|---|---|---|---|
| 4,690,526 A | * 9/1987 | Ledebuhr ..................... | 349/25 |
| 4,864,390 A | * 9/1989 | McKechnie et al. ......... | 345/87 |
| 5,311,227 A | * 5/1994 | Takayasu et al. ............ | 353/31 |

* cited by examiner

*Primary Examiner*—Russell Adams
*Assistant Examiner*—Andrew Sever

(57) ABSTRACT

A triple-lens type projection display includes a source for generating a white primary beam output, a first beam splitter for splitting the white primary beam output into a first color component and a secondary beam output, a second beam splitter for splitting the secondary beam output into a second color component and a third color component, first, second and third light modulators for modulating the first, second and third color components, respectively, a first projection lens for receiving the first color component from the first light modulator, a second projection lens for receiving the second color component from the second light modulator, and a third projection lens for receiving the third color component from the third light modulator. Each of the first, second and third color components has a respective optical path length that is measured from the first beam splitter to a respective one of the first, second and third light modulators. The optical path lengths of the first, second and third color components are equal.

16 Claims, 13 Drawing Sheets

TRIPLE-LENS TYPE PROJECTION DISPLAY WITH UNIFORM OPTICAL PATH LENGTHS FOR DIFFERENT COLOR COMPONENTS

BACKGROUND OF THE INVENTION

1. Field of the Invention

The invention relates to a projection display, more particularly to a triple-lens type projection display with uniform optical path lengths for different color components.

2. Description of the Related Art

Referring to FIG. 1, a conventional triple-lens type projection display 1 is shown to comprise a light source 11, a light filter 12 downstream of the light source 11 for removing ultraviolet rays and infrared rays from a light beam generated by the light source 11 to thereby obtain a white primary beam output, a first expansive lens 141 downstream of the light filter 12, a first beam splitter 131 downstream of the first expansive lens 141 to split the primary beam output from the first expansive lens 141 into a first color component and a secondary beam output, a second expansive lens 142 downstream of the first beam splitter 131, a second beam splitter 132 downstream of the second expansive lens 142 to split the secondary beam output from the second expansive lens 142 into second and third color components, and a third expansive lens 143 downstream of the second beam splitter 132. The first, second and third color components are generally primary color components, such as red, green and blue. The first color component from the first beam splitter 131 passes sequentially through a first focusing lens 151, a first polarizer 161, and a light-modulated first light valve 171 before being received by a first projection lens 181. The second color component from the second beam splitter 132 passes sequentially through a second focusing lens 152, a second polarizer 162, and a light-modulated second light valve 172 before being received by a second projection lens 182. The third color component from the third expansive lens 143 is reflected by a mirror 133 so as to pass sequentially through a third focusing lens 153, a third polarizer 163, and a light-modulated third light valve 173 before being received by a third projection lens 183. The first, second and third projection lenses 181, 182, 183 are disposed on a common plane, and project light onto a display screen 19 for showing an image on the latter.

It is noted that, while the distances of the first, second and third projection lenses 181, 182, 183 from the respective one of the first and second beam splitters 131, 132 and the mirror 133 are equal, the distance of the second beam splitter 132 from the light source 11 is longer than that of the first beam splitter 131, and that the distance of the mirror 133 from the light source is longer than that of the second beam splitter 132. There is thus a need to install the expansive lenses 141, 142, 143 to compensate for the differences in the optical path lengths traveled by the different color components.

However, because three expansive lenses 141, 142, 143 are needed for the three focusing lenses 151, 152, 153, the conventional projection display 1 involves a relatively large number of essential components. In addition, the expansive lenses 141, 142, 143 can introduce edge distortion to the image 191 shown on the plane of the light valves, as shown in FIG. 2.

SUMMARY OF THE INVENTION

Therefore, the main object of the present invention is to provide a triple-lens type projection display with uniform optical path lengths for different color components, thereby eliminating the need for expansive lenses as required in the aforesaid prior art.

According to this invention, a triple-lens type projection display comprises:

a source for generating a white primary beam output;

a first beam splitter for splitting the white primary beam output into a first color component and a secondary beam output;

a second beam splitter for splitting the secondary beam output into a second color component and a third color component;

first, second and third light modulators for modulating the first, second and third color components, respectively;

a first projection lens for receiving the first color component from the first light modulator;

a second projection lens for receiving the second color component from the second light modulator; and a third projection lens for receiving the third color component from the third light modulator.

Each of the first, second and third color components has a respective optical path length that is measured from the first beam splitter to a respective one of the first, second and third light modulators. The optical path lengths of the first, second and third color components are equal.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
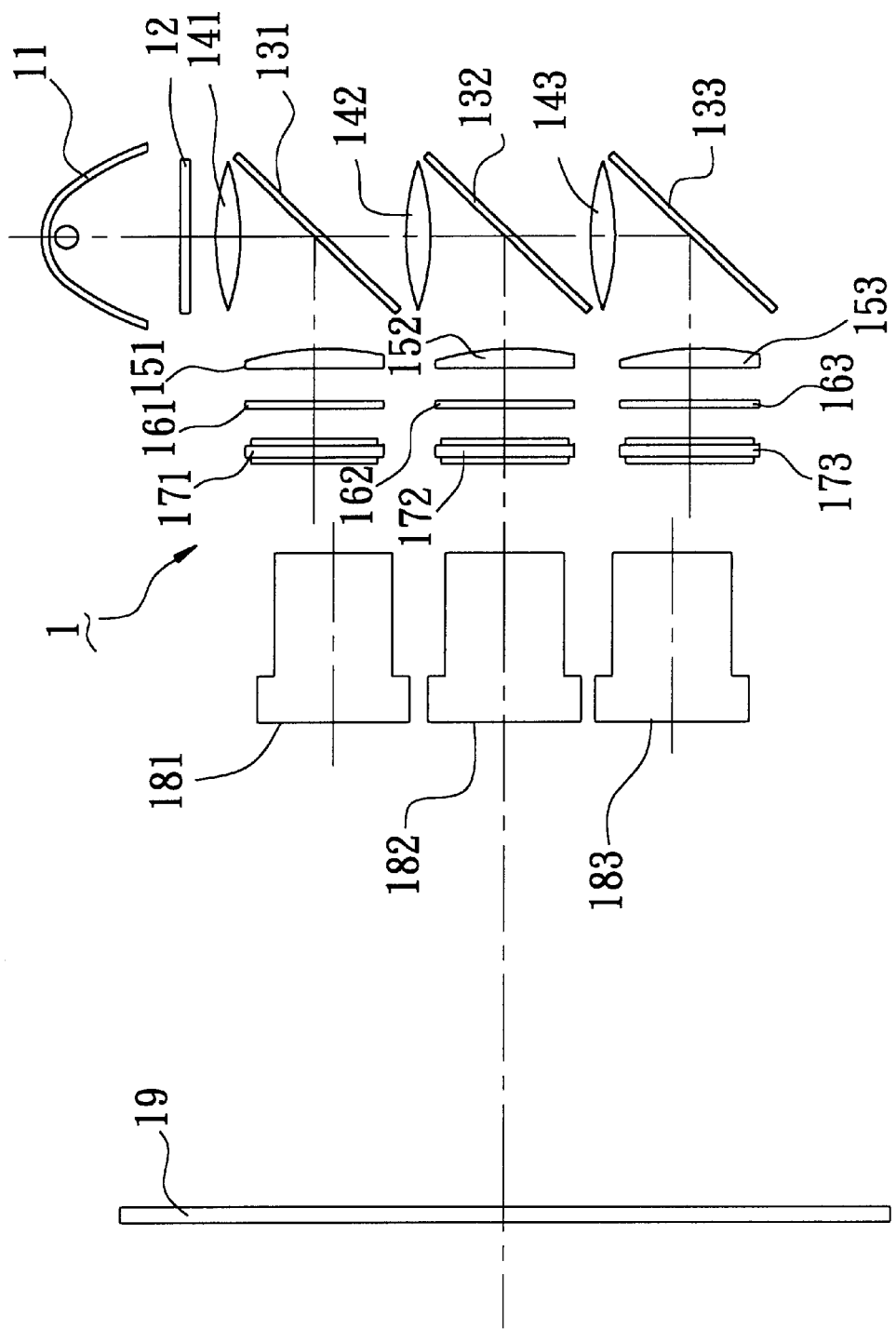
FIG. 1 illustrates a conventional triple-lens type projection display.
Figure 2:
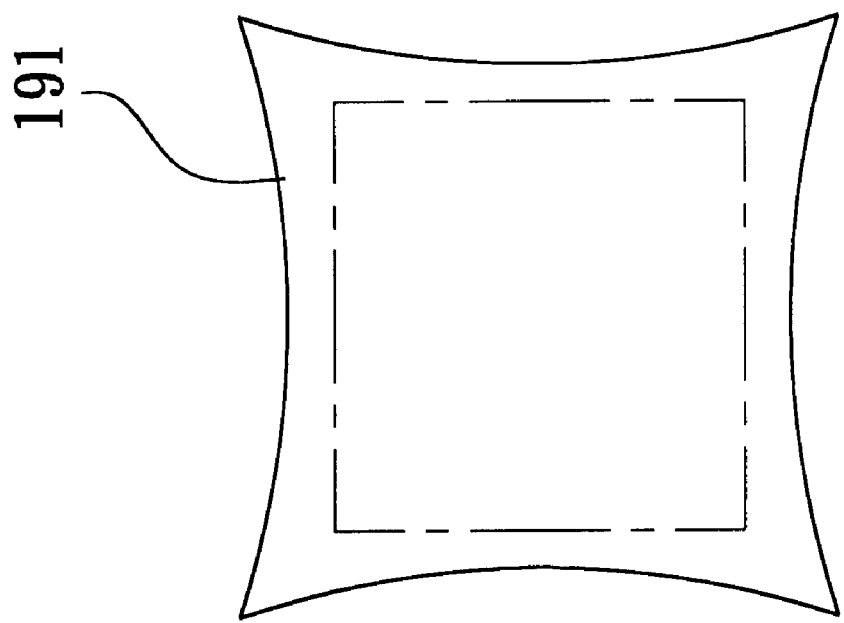
FIG. 2 illustrates a distorted image on the light valves, generated by the expansive lenses, and shown on the projection display of FIG. 1.
Figure 3:
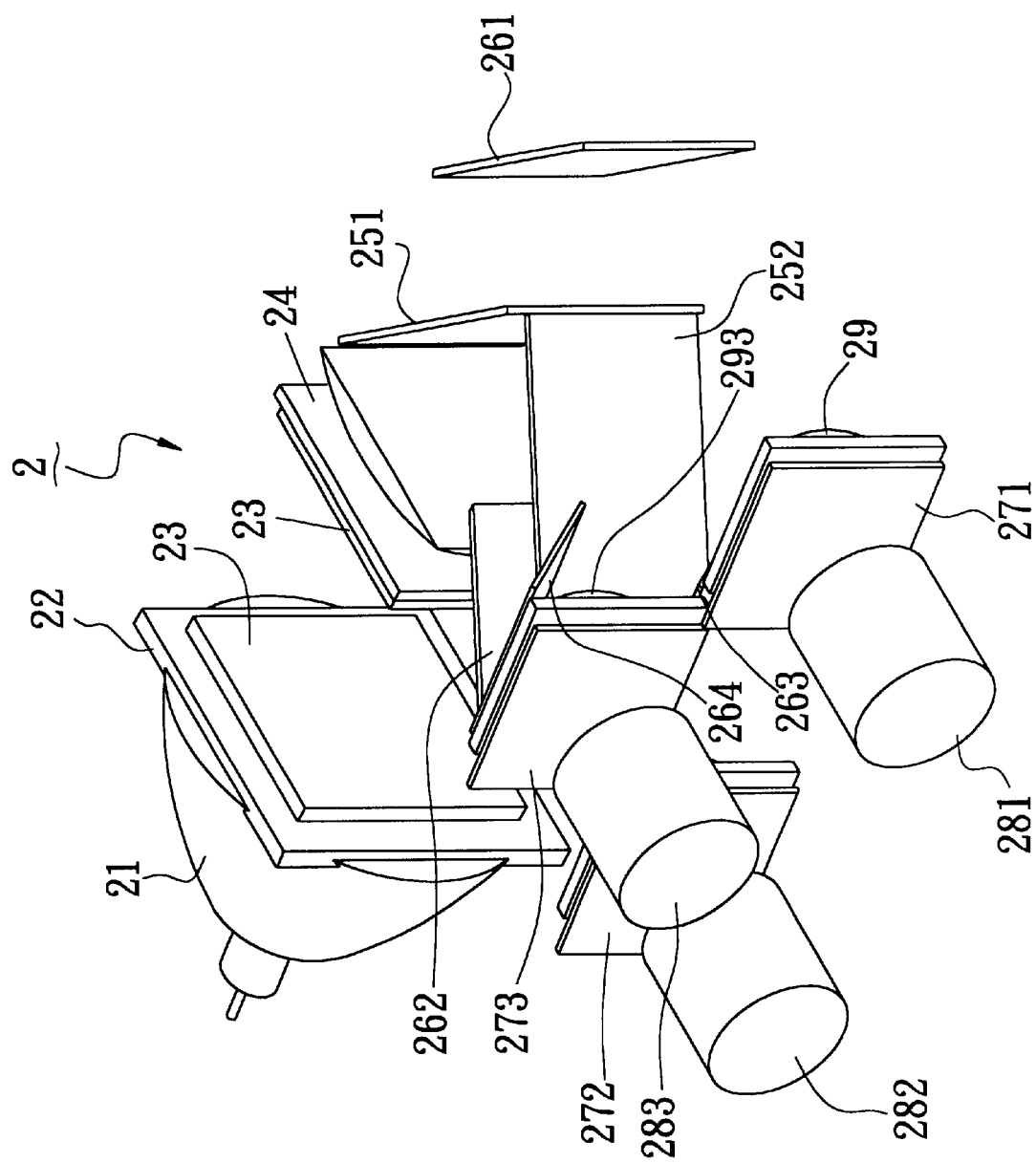
FIG. 3 is a perspective view of the first preferred embodiment of a triple-lens type projection display according to this invention.
Figure 4:
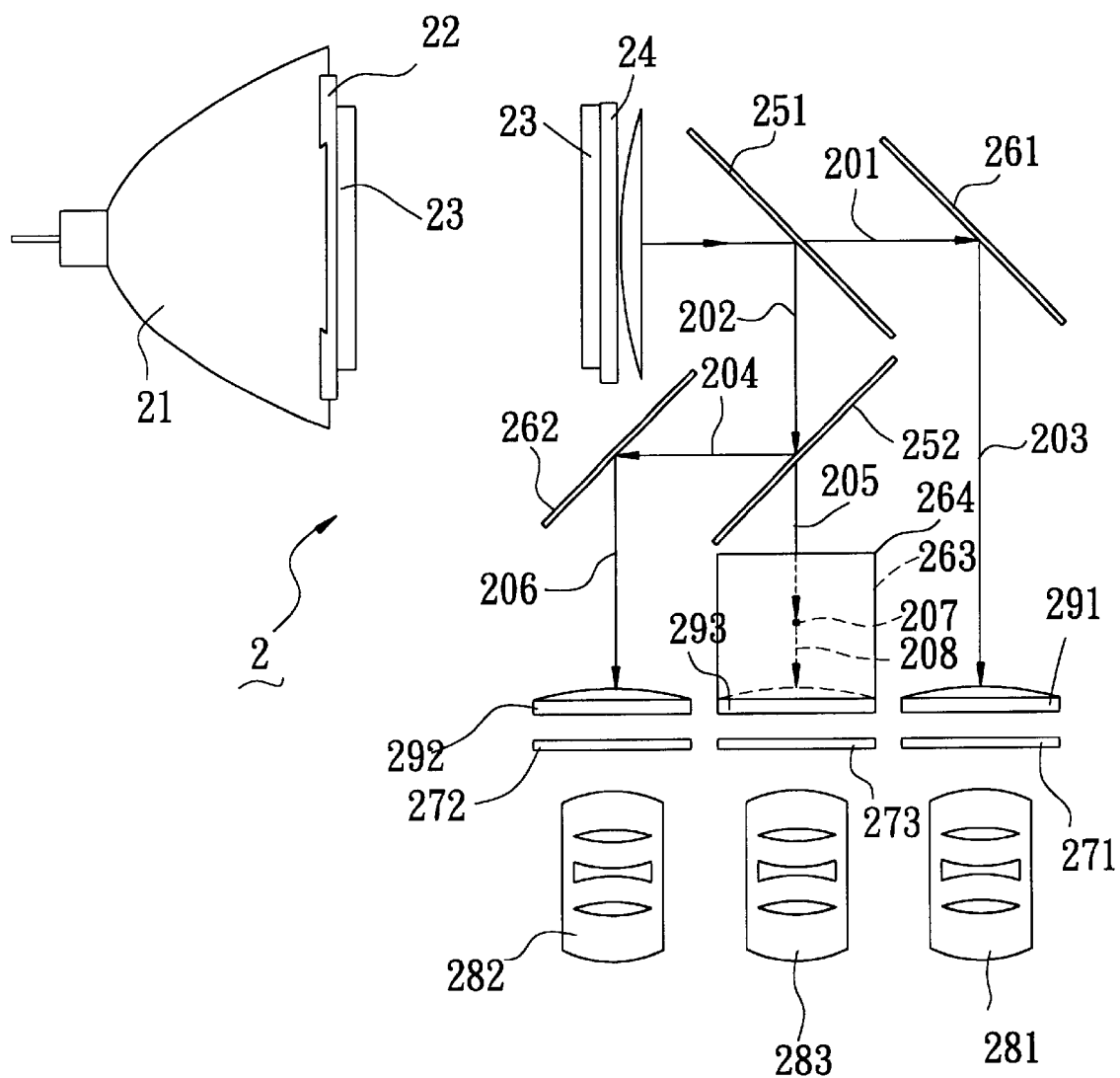
FIG. 4 is a schematic top view of the first preferred embodiment.
Figure 5:
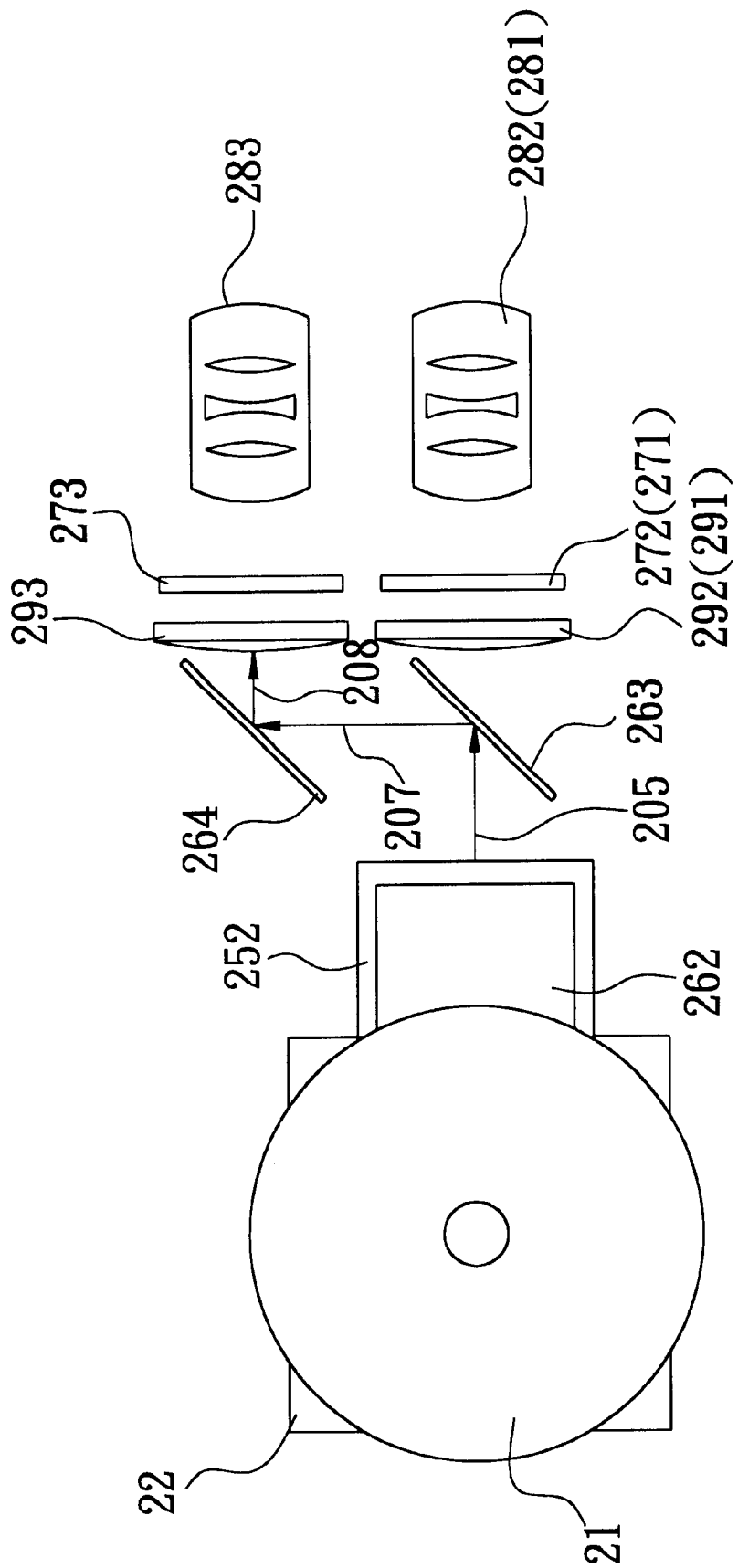
FIG. 5 is a schematic side view of the first preferred embodiment.

Referring to FIGS. 3, 4 and 5, the first preferred embodiment of a triple-lens type projection display 2 according to this invention is shown to comprise a light source 21, a light filter 22 downstream of the light source 21 for removing ultraviolet rays and infrared rays from a light beam generated by the light source 21 to thereby obtain a white primary beam output, an integrated lens set including a pair of spaced apart integrated lenses 23 downstream of the light filter 22 to ensure uniformity of the primary beam output, a polarizing or P/S converter 24 downstream of the integrated lens set 23, a first beam splitter 251 downstream of the P/S converter 24 to split the primary beam output from the P/S converter 24 into a first color component that travels along a first optical path 201 and a secondary beam output that travels along a second optical path 202 transverse to the first optical path 201, a first mirror 261 to direct the first color component along the first optical path 201 to travel along a third optical path 203 that is parallel to the second optical path 202, a second beam splitter 252 to split the secondary beam output along the second optical path 202 into a second color component that travels along a fourth optical path 204 transverse to the second optical path 202 and in a direction opposite to the first optical path 201 and into a third color component that travels along a fifth optical path 205 parallel to the second optical path 202, a second mirror 262 to direct the second color component along the fourth optical path 204 to travel along a sixth optical path 206 that is parallel to the second optical path 202, a third mirror 263 to direct the third color component along the fifth optical path 205 to travel along a seventh optical path 207 that is transverse to both the first and second optical paths 201, 202, and a fourth mirror 264 downstream of the third mirror 263 to direct the third color component along the seventh optical path 207 to travel along an eighth optical path 208 that is parallel to the fifth optical path 205. The third, sixth and eighth optical paths 203, 206, 208 are transverse to a common vertical plane, and form three vertices of an imaginary triangle on the common vertical plane. The third and sixth optical paths 203, 206 further traverse a horizontal line on the common vertical plane.

The first, second and third color components are generally primary color components, such as red, green and blue. The first color component along the third optical path 203 passes sequentially through a first focusing lens 291 and a light-modulated first light valve 271 before being received by a first projection lens 281. The second color component along the sixth optical path 206 passes sequentially through a second focusing lens 292 and a light-modulated second light valve 272 before being received by a second projection lens 282. The third color component along the eighth optical path 208 passes sequentially through a third focusing lens 293 and a light-modulated third light valve 273 before being received by a third projection lens 283. The first, second and third light valves 271, 272, 273 are thus disposed on the common vertical plane traversed by the third, sixth and eighth optical paths 203, 206, 208.

The first, second and third light valves 271, 272, 273 are transmissive liquid crystal light valves. As is known in the art, the first, second and third projection lenses 281, 282, 283 project light onto a display screen (not shown) for showing an image on the latter.

In the preferred embodiment, the first, fourth and seventh optical paths 201, 204, 207 have equal path lengths (P1=P4=P7). The third optical path 203 has a path length (P3) equal to the sum of the path lengths (P2, P6) of the second and sixth optical paths 202, 206. The path length (P6) of the sixth optical path 206 is equal to the sum of the path lengths (P5, P8) of the fifth and eighth optical paths 205, 208.

Thus, the path length for the first color component, measured from the first beam splitter 251 to the first focusing lens 291, is equal to P1+P3=P1+P2+P6=P4+P2+P6. The path length for the second color component, measured from the first beam splitter 251 to the second focusing lens 292, is equal to P2+P4+P6. The path length for the third color component, measured from the first beam splitter 251 to the third focusing lens 293, is equal to P2+P5+P7+P8=P2+P4+P6.

In view of the uniform path lengths for the different color components, there is no need to use the expansive lenses as required in the aforesaid conventional projection display 1, thereby eliminating the edge distortion effect that is introduced to the image shown on the plane of the light valves.

Figure 6:
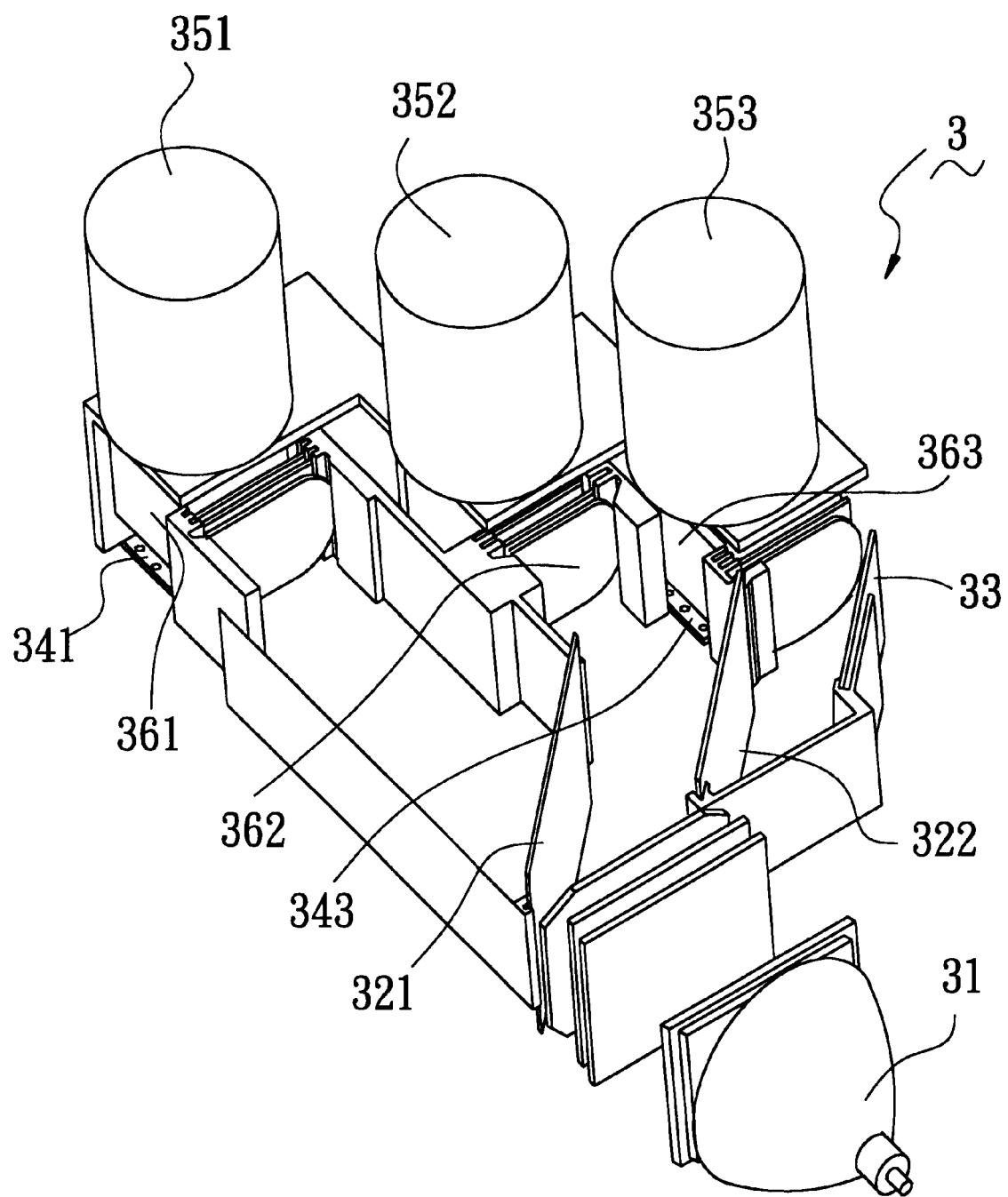
FIG. 6 is a perspective view of the second preferred embodiment of a triple-lens type projection display according to this invention.
Figure 7:
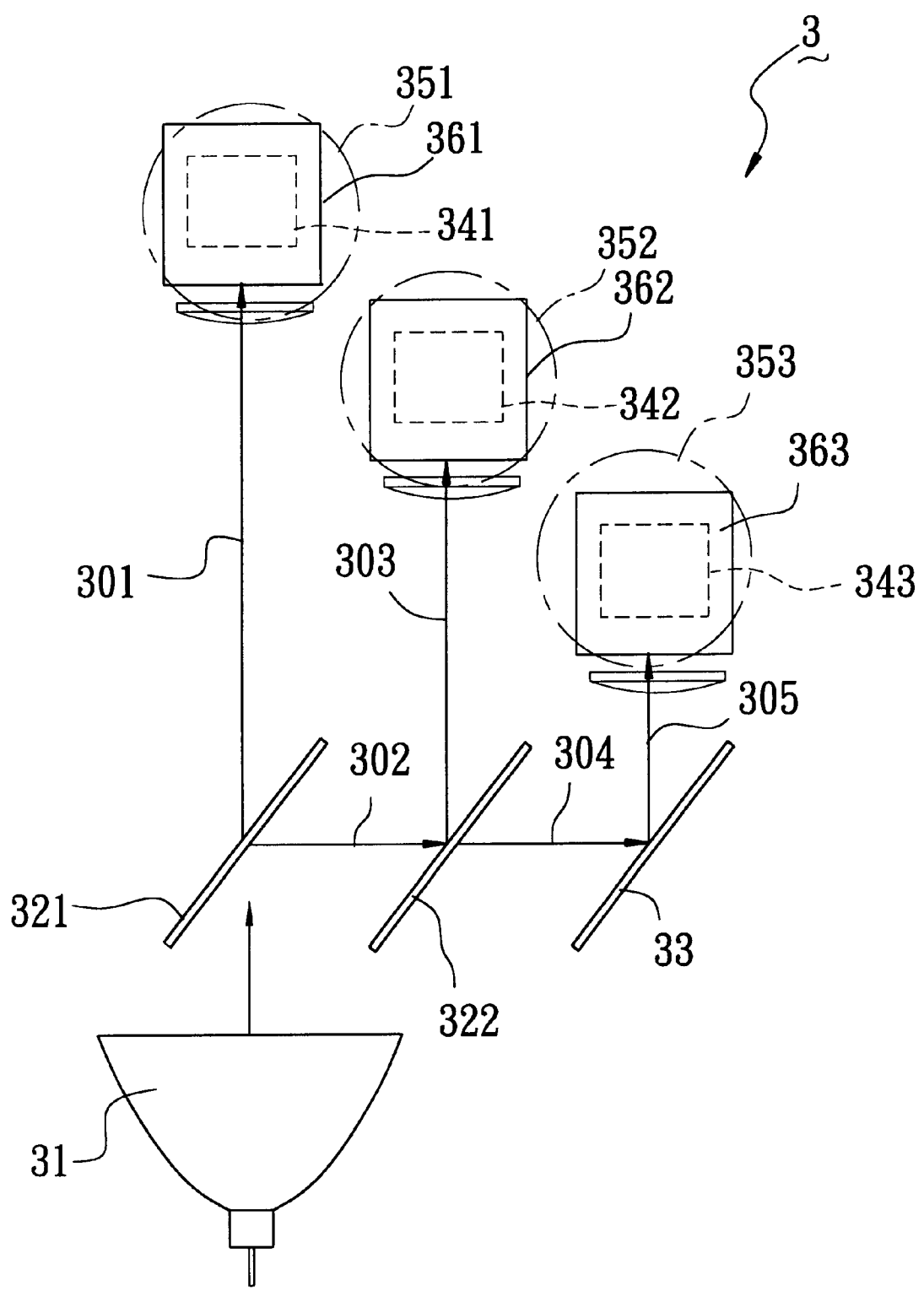
FIG. 7 is a schematic top view of the second preferred embodiment.
Figure 8:
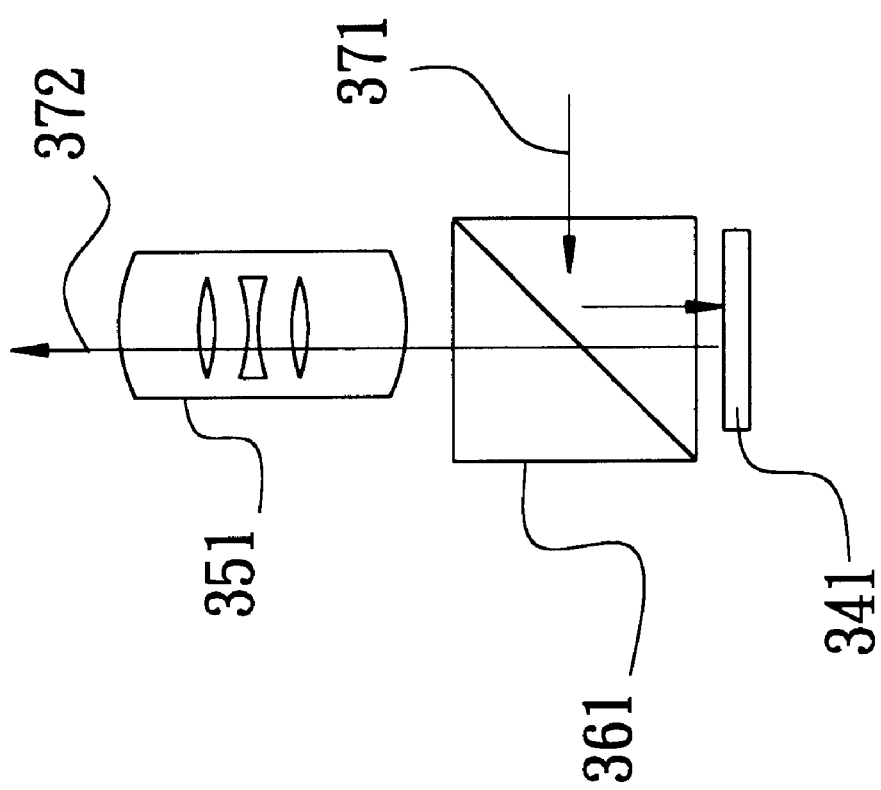
FIG. 8 illustrates a light valve, a polarization beam splitter and a projection lens of the second preferred embodiment.

Referring to FIGS. 6, 7 and 8, the second preferred embodiment of a triple-lens type projection display 3 according to this invention is shown to comprise a light source 31, a light filter (not shown) downstream of the light source 31 for removing ultraviolet rays and infrared rays from a light beam generated by the light source 31 to thereby obtain a white primary beam output, an integrated lens set including a pair of spaced apart integrated lenses (not shown) downstream of the light filter to ensure uniformity of the primary beam output, a polarizing or P/S converter (not shown) downstream of the integrated lens set, a first beam splitter 321 downstream of the P/S converter to split the primary beam output from the P/S converter into a first color component that travels along a first optical path 301 and a secondary beam output that travels along a second optical path 302 transverse to the first optical path 301, a second beam splitter 322 to split the secondary beam output along the second optical path 302 into a second color component that travels along a third optical path 303 parallel to the first optical path 301 and into a third color component that travels along a fourth optical path 304 parallel to the second optical path 302, and a mirror 33 to direct the third color component along the fourth optical path 304 to travel along a fifth optical path 305 that is parallel to the first optical path 301. The first, third and fifth optical paths 301, 303, 305 are transverse to a common vertical plane, and traverse a horizontal line on the common vertical plane.

The first, second and third color components are generally primary color components, such as red, green and blue. The first color component along the first optical path 301 passes through a first focusing lens (not shown), a first polarization beam splitter 361 and a light-modulated first light valve 341 before being received by a first projection lens 351. Particularly, as shown in FIG. 8, incident light with S-polarization 371 from the first focusing lens is directed by the first polarization beam splitter 361 to the first light valve 341. The first light valve 341, which is a reflective light valve, reflects light back to the first polarization beam splitter 361. The reflected light with P-polarization 372 is subsequently directed by the first polarization beam splitter 361 to the first projection lens 351.

The second color component along the third optical path 303 passes through a second focusing lens (not shown), a second polarization beam splitter 362 and a light-modulated second light valve 342 before being received by a second projection lens 352. The second focusing lens, the second polarization beam splitter 362 and the second light valve 342 operate in a manner similar to the first focusing lens, the first polarization beam splitter 361 and the first light valve 341.

The third color component along the fifth optical path 305 passes through a third focusing lens (not shown), a third polarization beam splitter 363 and a light-modulated third light valve 343 before being received by a third projection lens 353. The third focusing lens, the third polarization beam splitter 363 and the third light valve 343 operate in a manner similar to the first focusing lens, the first polarization beam splitter 361 and the first light valve 341.

Like the previous embodiment, light from the first, second and third projection lenses 351, 352, 353 are projected on a display screen (not shown) for showing an image on the latter.

In the second preferred embodiment, the first optical path 301 has a path length (P1) equal to the sum of the path lengths (P2, P3) of the second and third optical paths 302, 303. The path length (P3) of the third optical path 303 is equal to the sum of the path lengths (P4, P5) of the fourth and fifth optical paths 304, 305. Thus, with reference to a common vertical plane upon which the first and second beam splitters 321, 322 and the mirror 33 are disposed, the first projection lens 351 is farther from the common vertical plane than the second projection lens 352, and the second projection lens 352 is farther from the common vertical plane than the third projection lens 353.

The path length for the first color component, measured from the first beam splitter 321 to the first focusing lens, is equal to P1. The path length for the second color component, measured from the first beam splitter 321 to the second focusing lens, is equal to P2+P3=P1. The path length for the third color component, measured from the first beam splitter 321 to the third focusing lens, is equal to P2+P4+P5=P2+P3=P1. The different color components thus have uniform path lengths in the second preferred embodiment of this invention.

Figure 9:
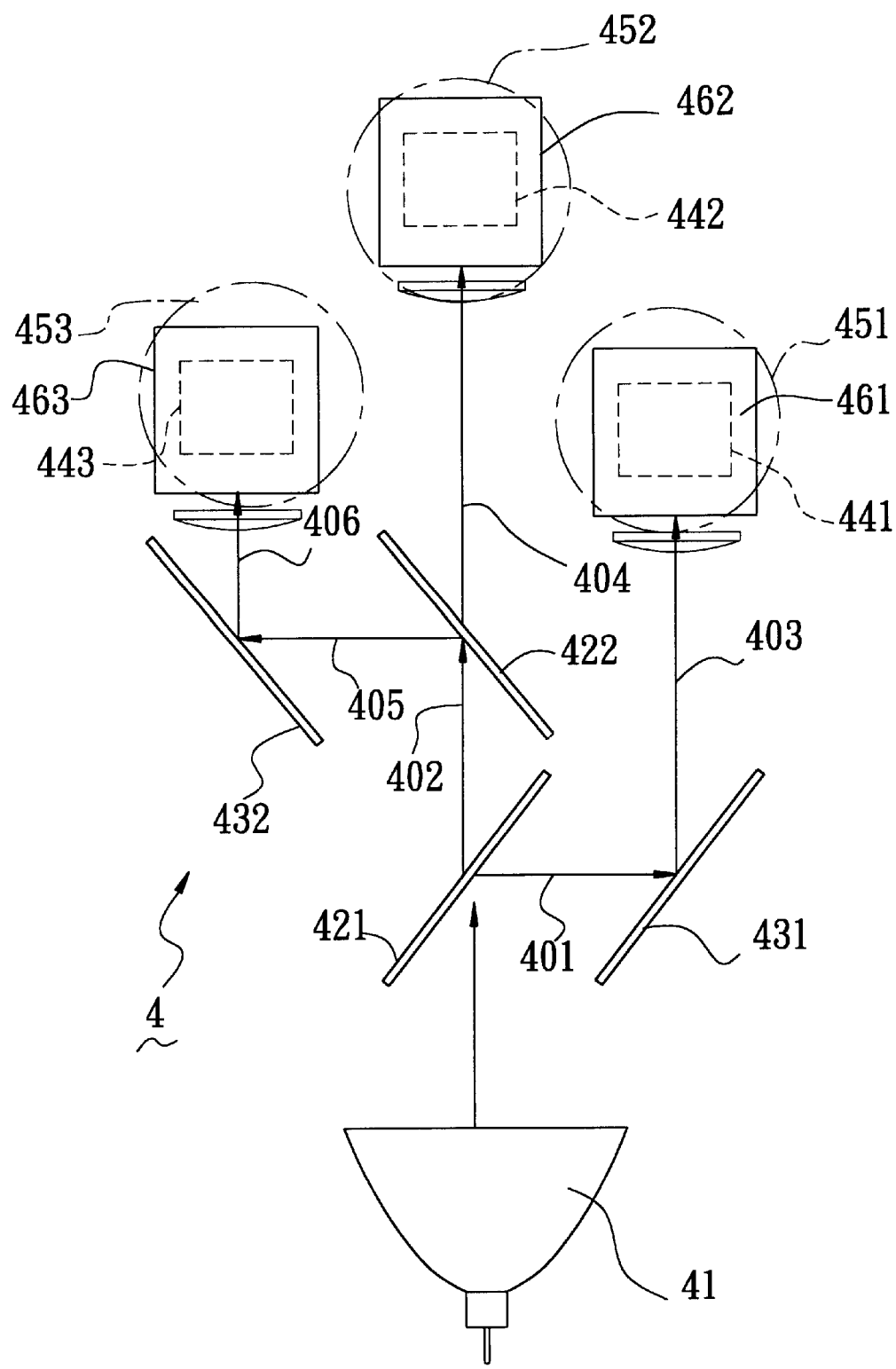
FIG. 9 is a schematic top view of the third preferred embodiment of a triple-lens type projection display according to this invention.

The third preferred embodiment of a triple-lens type projection display 4 according to this invention is shown in FIG. 9. Unlike the second preferred embodiment, the projection display 4 comprises a source 41 for providing a white primary beam output, a first beam splitter 421 downstream of the source 41 to split the primary beam output from the source 41 into a first color component that travels along a first optical path 401 and a secondary beam output that travels along a second optical path 402 transverse to the first optical path 401, a first mirror 431 to direct the first color component along the first optical path 401 to travel along a third optical path 403 parallel to the second optical path 402, a second beam splitter 422 to split the secondary beam output along the second optical path 402 into a second color component that travels along a fourth optical path 404 parallel to the second optical path 402 and into a third color component that travels along a fifth optical path 405 transverse to the second optical path 402 and in a direction opposite to the first optical path 401, and a second mirror 432 to direct the third color component along the fifth optical path 405 to travel along a sixth optical path 406 that is parallel to the second optical path 402.

The first, second and third color components are generally primary color components, such as red, green and blue. The first color component along the third optical path 403 passes through a first focusing lens (not shown), a first polarization beam splitter 461 and a light-modulated!first light valve 441 before being received by a first projection lens 451 in a manner similar to the second preferred embodiment.

The second color component along the fourth optical path 404 passes through a second focusing lens (not shown), a second polarization beam splitter 462 and a light-modulated second light valve 442 before being received by a second projection lens 452 in a manner similar to the second preferred embodiment.

The third color component along the sixth optical path 406 passes through a third focusing lens (not shown), a third polarization beam splitter 463 and a light-modulated third light valve 443 before being received by a third projection lens 453 in a manner similar to the second preferred embodiment.

Like the previous embodiments, light from the first, second and third projection lenses 451, 452, 453 are projected on a display screen (not shown) for showing an image on the latter.

In the third preferred embodiment, the sum of the path lengths (P1, P3) of the first and third optical paths 401, 403 is equal to the sum of the path lengths (P2, P4) of the second and fourth optical paths 402, 404. The path length (P4) of the fourth optical path 404 is equal to the sum of the path lengths (P5, P6) of the fifth and sixth optical paths 405, 406. The first, second and third projection lenses 451, 452, 453 are thus arranged in a triangular formation with respect to a common horizontal plane.

The path length for the first color component, measured from the first beam splitter 421 to the first focusing lens, is equal to P1+P3=P2+P4. The path length for the second color component, measured from the first beam splitter 421 to the second focusing lens, is equal to P2+P4. The path length for the third color component, measured from the first beam splitter 421 to the third focusing lens, is equal to P2+P5+P6=P2+P4.

The different color components thus have uniform path lengths in the third preferred embodiment of this invention.

Figure 10:
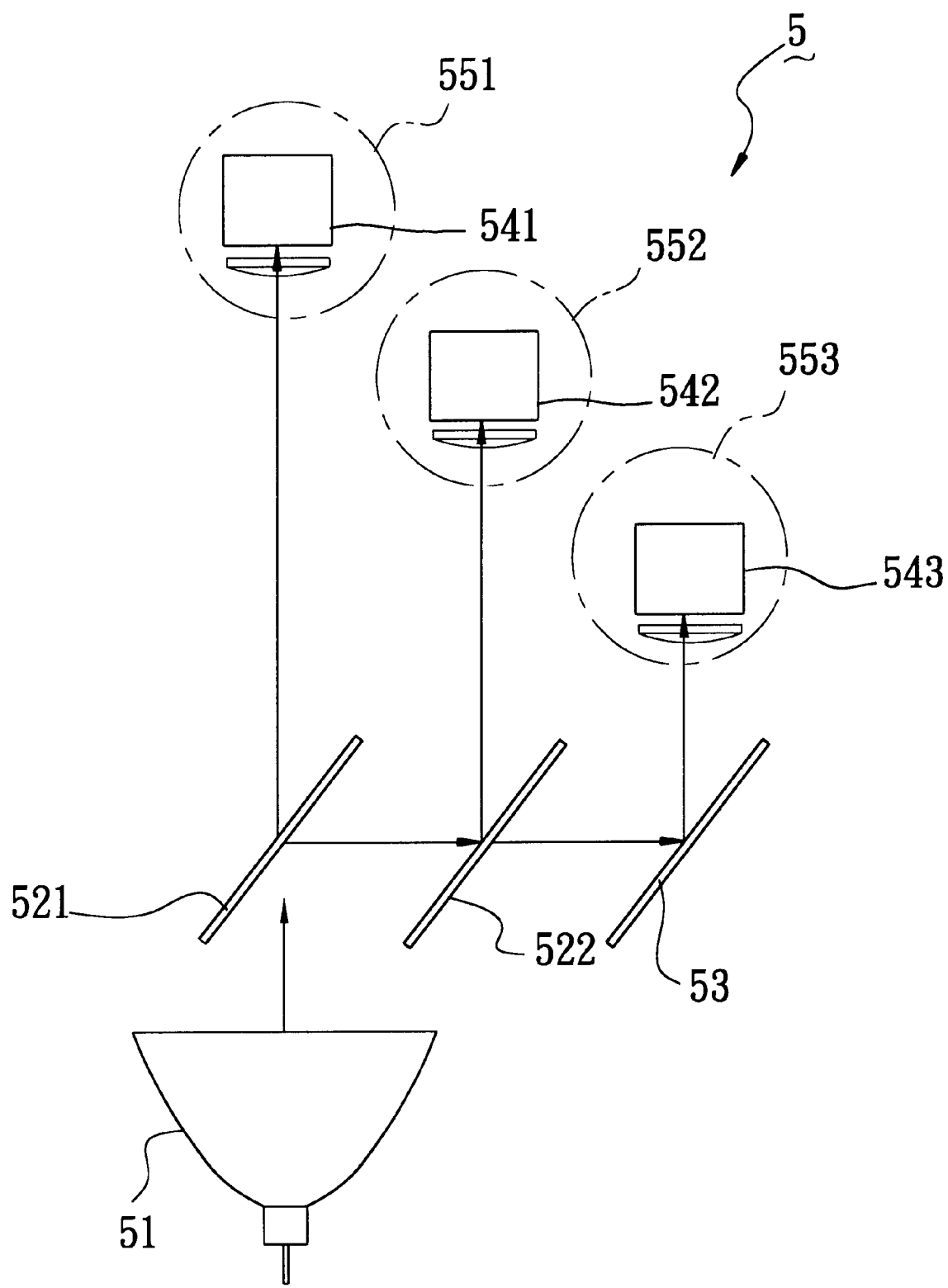
FIG. 10 is a schematic top view of the fourth preferred embodiment of a triple-lens type projection display according to this invention.
Figure 11:
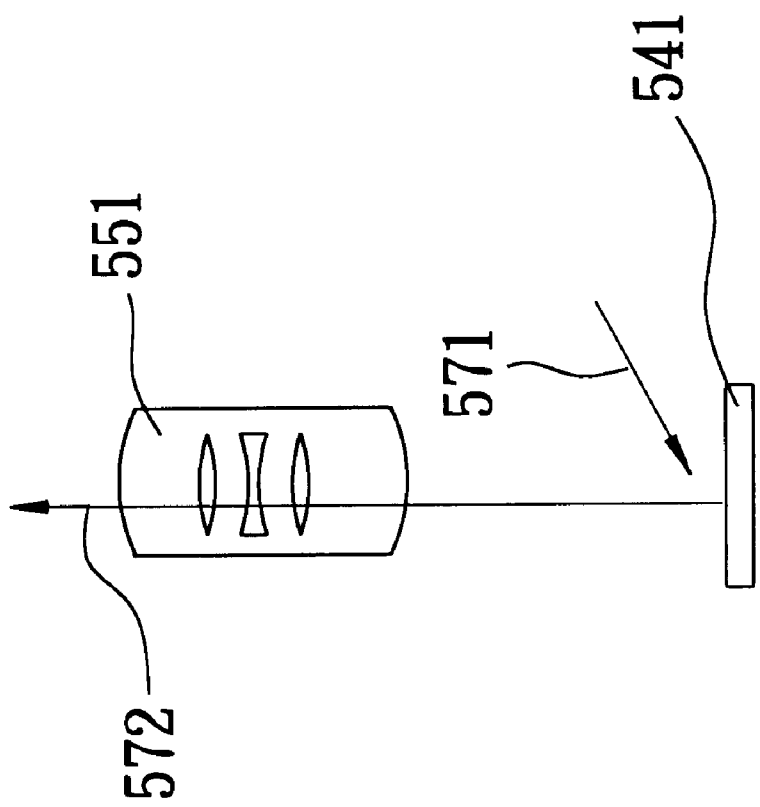
FIG. 11 illustrates a light valve and a projection lens of the fourth preferred embodiment.

FIGS. 10 and 11 illustrate the fourth preferred embodiment of a triple-lens type projection display 5 according to this invention. The projection display 5 is based upon the second preferred embodiment, and includes a light source 51, first and second beam splitters 521, 522, and a mirror 53 which cooperate to form three color components in three different optical paths having uniform optical path lengths.

Unlike the second preferred embodiment, there is no polarization beam splitter between a light valve and a projection lens for each color component. Particularly, with reference to FIG. 11, incident light 571 of the first color component impinges upon a light-modulated first light valve (DMD) 541, which is a digital reflective light valve, at an angle relative to the plane of the first light valve 541. Reflected light 572 from the first light valve 541, which is transverse to the plane of the first light valve 541, is provided directly to a first projection lens 551.

Like the first color component, the second color component is received by a second projection lens 552 via a digital reflective second light valve 542, whereas the third color component is received by a third projection lens 553 via a digital reflective third light valve 543.

Figure 12:
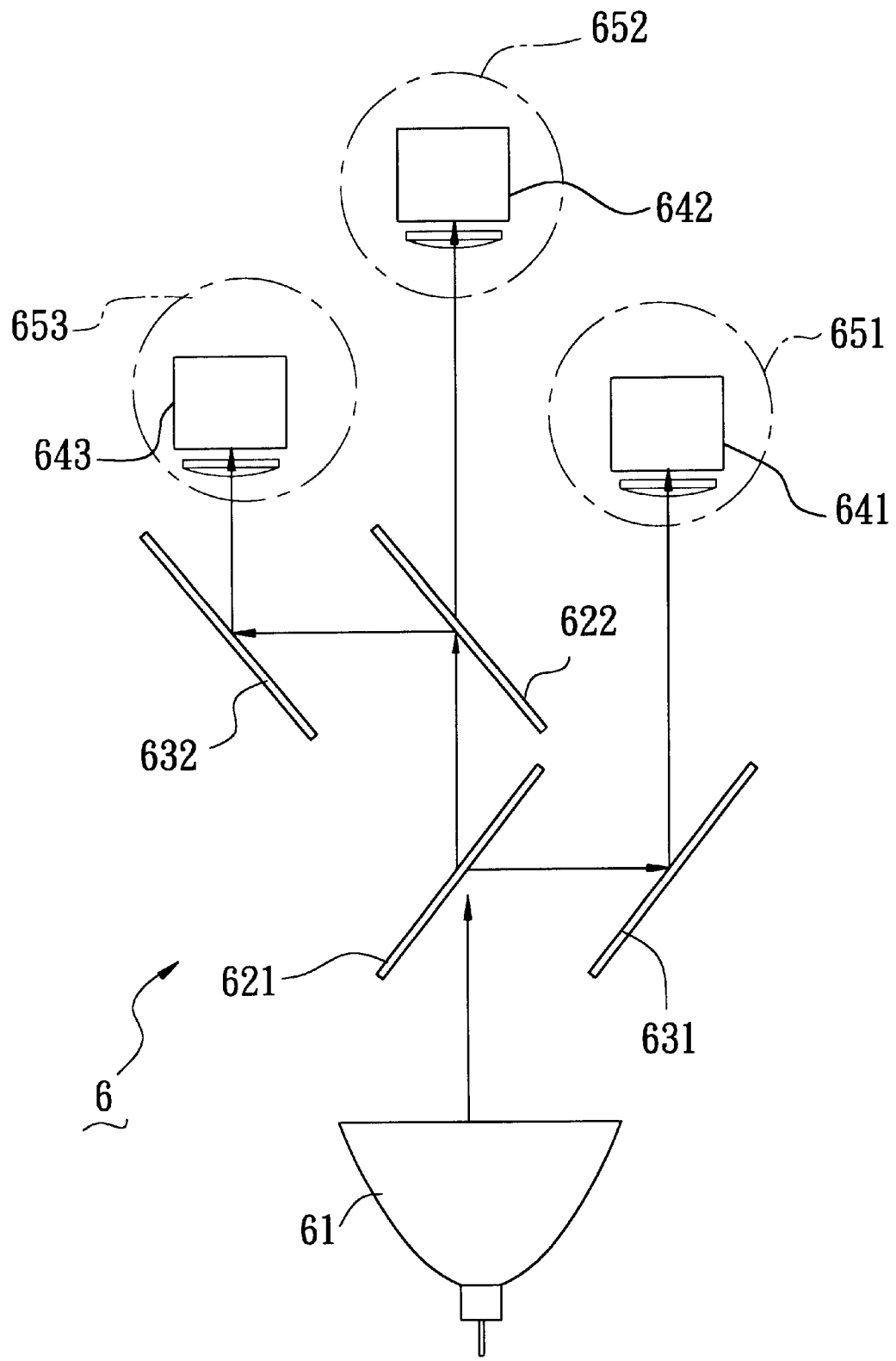
FIG. 12 is a schematic top view of the fifth preferred embodiment of a triple-lens type projection display according to this invention.

FIG. 12 illustrates the fifth preferred embodiment of a triple-lens type projection display 6 according to this invention. The projection display 6 is based upon the third preferred embodiment, and includes a light source 61, first and second beam splitters 621, 622, and first and second mirrors 631, 632 which cooperate to form three color components in three different optical paths having uniform optical path lengths.

Unlike the third preferred embodiment, there is no polarization beam splitter between a light valve and a projection lens for each color component. Instead, the first color component is received by a first projection lens 651 via a digital reflective first light valve 641 in a manner similar to the fourth preferred embodiment. Likewise, the second color component is received by a second projection lens 652 via a digital reflective second light valve 642, whereas the third color component is received by a third projection lens 653 via a digital reflective third light valve 643.

Figure 13:
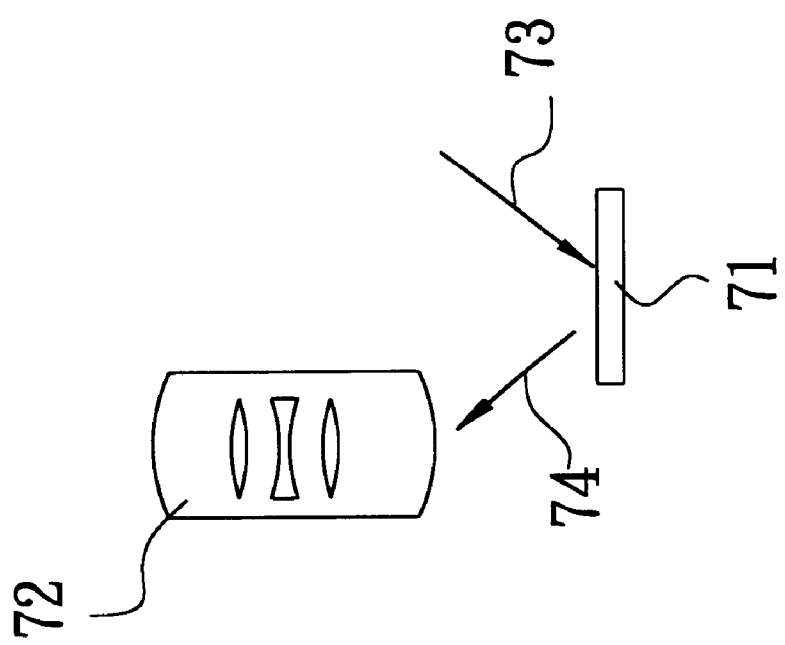
FIG. 13 illustrates a light valve and a projection lens of the sixth preferred embodiment of a triple-lens type projection display according to this invention.

FIG. 13 illustrates a light valve 71 and a projection lens 72 of the sixth preferred embodiment of a triple-lens type projection display according to this invention. Unlike the fourth and fifth preferred embodiments, the light valve 71 is an inclined reflective liquid crystal light valve. Incident light 73 impinges upon the light valve 71 at an angle relative to the plane of the latter. Reflected light 74 from the light valve 71, which also forms an angle with the plane of the latter, is provided directly to the projection lens 72. The projection lens 72 is thus staggered with respect to the light valve 71 to result in a flatter arrangement as compared to the light valve and projection lens set of the fourth and fifth preferred embodiments.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A triple-lens type projection display, comprising:
   a source for generating a white primary beam output;
   a first beam splitter for splitting the white primary beam output into a first color component and a secondary beam output;
   a second beam splitter for splitting the secondary beam output into a second color component and a third color component;
   first, second and third light modulators for modulating the first, second and third color components, respectively;
   a first projection lens for receiving the first color component from said first light modulator;
   a second projection lens for receiving the second color component from said second light modulator; and
   a third projection lens for receiving the third color component from said third light modulator;
   wherein each of the first, second and third color components has a respective optical path length that is measured from said first beam splitter to the respective one of said first, second and third light modulators; and
   wherein the optical path lengths of the first, second and third color components are equal.

2. The triple-lens type projection display of claim 1, wherein said first, second and third light modulators are disposed on a common vertical plane, and form three vertices of an imaginary triangle on the common vertical plane.

3. The triple-lens type projection display of claim 2, wherein each of said first, second and third light modulators is a transmissive liquid crystal light valve.

4. The triple-lens type projection display of claim 1,
   wherein the first color component from said first beam splitter travels along a first optical path,
   wherein the secondary beam output from said first beam splitter travels along a second optical path that is transverse to the first optical path so as to be received by said second beam splitter,
   wherein said projection display further comprises a first mirror to direct the first color component along the first optical path to travel along a third optical path that is parallel to the second optical path so as to be received by said first light modulator,
   wherein the second color component from said second beam splitter travels along a fourth optical path transverse to the second optical path and in a direction opposite to the first optical path,
   wherein the third color component from said second beam splitter travels along a fifth optical path parallel to the second optical path,
   wherein said projection display further comprises a second mirror to direct the second color component along the fourth optical path to travel along a sixth optical path that is parallel to the second optical path so as to be received by said second light modulator,
   wherein said projection display further comprises a third mirror to direct the third color component along the fifth optical path to travel along a seventh optical path that is transverse to the first and second optical paths, and
   wherein said projection display further comprises a fourth mirror to direct the third color component along the seventh optical path to travel along an eighth optical path that is parallel to the fifth optical path so as to be received by said third light modulator.

5. The triple-lens type projection display of claim 4, wherein the first, fourth and seventh optical paths have equal path lengths, wherein the third optical path has a path length equal to sum of path lengths of the second and sixth optical paths, and wherein the path length of the sixth optical path is equal to sum of path lengths of the fifth and eighth optical paths.

6. The triple-lens type projection display of claim 1,
   wherein the first color component from said first beam splitter travels along a first optical path so as to be received by said first light modulator,
   wherein the secondary beam output from said first beam splitter travels along a second optical path that is transverse to the first optical path so as to be received by said second beam splitter,
   wherein the second color component from said second beam splitter travels along a third optical path that is parallel to the first optical path so as to be received by said second light modulator,
   wherein the third color component from said second beam splitter travels along a fourth optical path that is parallel to the second optical path, and
   wherein said projection display further comprises a mirror to direct the third color component along the fourth optical path to travel along a fifth optical path that is parallel to the first optical path so as to be received by said third light modulator.

7. The triple-lens type projection display of claim 6, wherein said first and second beam splitters and said mirror are disposed on a common vertical plane, wherein said first light modulator is farther from the common vertical plane than said second light modulator, and wherein said second light modulator is farther from the common vertical plane than said third light modulator.

8. The triple-lens type projection display of claim 6, wherein the first optical path has a path length equal to sum of path lengths of the second and third optical paths, and the path length of the third optical path is equal to sum of path lengths of the fourth and fifth optical paths.

9. The triple-lens type projection display of claim 6, wherein each of said first, second and third light modulators is a reflective light valve.

10. The triple-lens type projection display of claim 9, further comprising first, second and third polarization beam splitters disposed between a respective one of said first, second and third light modulators and a respective one of said first, second and third projection lenses, each of said polarization beam splitters directing a respective one of the color components to the respective one of said light modulators, and further directing light reflected by the respective one of said light modulators to the respective one of said projection lenses.

11. The triple-lens type projection display of claim 6, wherein each of said first, second and third light modulators is a reflective light valve that reflects the respective one of the color components directly to the respective one of said projection lenses.

12. The triple-lens type projection display of claim 1,
wherein the first color component from said first beam splitter travels along a first optical path,
wherein the secondary beam output from said first beam splitter travels along a second optical path that is transverse to the first optical path so as to be received by said second beam splitter,
wherein said projection display further comprises a first mirror to direct the first color component along the first optical path to travel along a third optical path that is parallel to the second optical path so as to be received by said first light modulator,
wherein the second color component from said second beam splitter travels along a fourth optical path that is parallel to the second optical path so as to be received by said second light modulator,
wherein the third color component from said second beam splitter travels along a fifth optical path transverse to the second optical path and in a direction opposite to the first optical path, and
wherein said projection display further comprises a second mirror to direct the third color component along the fifth optical path to travel along a sixth optical path that is parallel to the second optical path so as to be received by said third light modulator.

13. The triple-lens type projection display of claim 12, wherein sum of path lengths of the first and third optical paths is equal to sum of path lengths of the second and fourth optical paths, and the path length of the fourth optical path is equal to sum of path lengths of the fifth and sixth optical paths.

14. The triple-lens type projection display of claim 12, wherein each of said first, second and third light modulators is a reflective light valve.

15. The triple-lens type projection display of claim 14, further comprising first, second and third polarization beam splitters disposed between a respective one of said first, second and third light modulators and a respective one of said first, second and third projection lenses, each of said polarization beam splitters directing a respective one of the color components to the respective one of said light modulators, and further directing light reflected by the respective one of said light modulators to the respective one of said projection lenses.

16. The triple-lens type projection display of claim 12, wherein each of said first, second and third light modulators is a reflective light valve that reflects the respective one of the color components directly to the respective one of said projection lenses.

* * * * *